DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JULY 20, 1971

888 O.G. 707

T888,013

ELECTROPHOTOGRAPHIC SPEED OF INORGANIC PHOTOCONDUCTORS IS INCREASED BY THE ADDITION OF ORGANIC PHOTOCONDUCTORS

Paul B. Gilman, Jr., 1669 Lake Ave., Rochester, N.Y. 14615

Filed Nov. 27, 1970, Ser. No. 93,449
Int. Cl. G03g *5/06, 5/08*
U.S. Cl. 96—1.5
No Drawing. 19 Pages Specification

The electrophotographic speed of inorganic photoconductor and xeroradiographic compositions, such as those containing $TiO_2$ and PbO, can be improved by including an organic photoconductor in the electrophotographic element. The organic and inorganic photoconductors can be in separate layers or in the same layer of the element. For example, a solution of 398 g. of toluene, 52.7 g. of polyvinyl butyral binder resin, 17.5 $TiO_2$ is coated on a clay-coated conductive paper. Over the resulting layer of $TiO_2$-binder resin is coated at a wet thickness of 0.006 inch a solution of 200 g. methylene chloride, 18 g. polycarbonate binder resin and 12 g. of the organic photoconductor 4,4' - diethylamino-2,2'-dimethyltriphenylmethane. The double coated element has greater sensitivity than either the $TiO_2$ layer or the organic photoconductor alone. The increase in speed is greater than the cumulative speed of the separate components. Similar improvement occurs when the organic photoconductor (1.0 g. in 0.5 ml. methylene chloride) is added to 25 ml. of a $TiO_2$ dispersion in polyvinyl butyral resin and coated at 0.004 inch wet thickness on conducting paper.